Patented Sept. 8, 1931

1,822,227

UNITED STATES PATENT OFFICE

KARL LENDRICH, OF HAMBURG, GERMANY; LOUISE B. P. LENDRICH, WIDOW; ERNA C. WEMMERING, DAUGHTER; AND OTTO LENDRICH, SON, HEIRS AT LAW OF SAID KARL LENDRICH, DECEASED

PROCESS OF IMPROVING COFFEE-BEANS

No Drawing. Application filed November 3, 1928, Serial No. 317,123, and in Germany December 21, 1927.

The present invention relates to a novel process of improving coffee-beans.

According to origin, growth, climatic and cultural conditions of the plantations, and also perhaps influenced by the manner of harvesting, the different kinds of coffee put on the market show rather considerable differences in their roasted state and in the hot drinks therefrom, both in aroma and taste.
The trade knows mild and strong tasting coffees in numerous varieties, the character of which in one or other direction is not only confined to certain districts, but may also be met with on the same plantation in different varieties.

The effect of the more or less strong tasting coffee will be manifest, when drinking it, by a prominent, sharp, astringent and not infrequently a distinctly sourish taste diminishing the aroma and leaving behind as an attendant phenomenon an unpleasant taste in the cavity of the mouth. The said taste is sometimes so persistent that even some considerable time after having partaken of such coffee, one is still conscious of this unpalatable feeling. As a consequence a great number of varities of coffee of certain origin, although otherwise of immaculate quality, are not favored in many countries, having either no sale at all or being used only for mixing with other soft tasting kinds of coffee.

Various attempts have been made to get rid of this strong taste by special treatment of the beans or to moderate this taste, but so far these attempts have not led to a really practical result.

Thorough investigations now have proved that the cause of this obtrusive strong taste of the coffee, which diminishes considerably its aroma and also its enjoyment, is to be attributed chiefly to an excess-quantity of chlorogenic acid which is found as a natural constituent part of all kinds of coffee and which closely resembles tanning materials, the said chlorogenic acid being partly free, partly combined with caffeine as chlorogenate of potassium-caffeine.

With the knowledge of this fact attempts have been made to considerably reduce and limit the influence of the chlorogenic acid on the taste of the coffee or to abolish it altogether.

These attempts have led to a process adapted to decompose the said acid in the coffee-bean itself, and as this process may be carried out to any desired extent the result will be that the taste of strong kinds of coffee may be influenced in such a manner that they show the qualities of a mild coffee or when the decomposition is intentionally limited, that of a medium coffee in the middle between mild and strong.

Chemistry dealing with coffee has succeeded in obtaining chlorogenate of potassium-caffeine from raw coffee and in decomposing from this compound, by the action of diluted sulphuric acid, the chlorogenic acid in a pure and crystalline state.

It has been ascertained that the chlorogenic acid forms a dibasic strong acid of an astringent, sharp, bitter, taste, which acid could be further decomposed by hydrolysis in an aqueous solution by means of a diluted potash- or soda-lye in the cold or by diluted mineral acids and longer boiling, into two novel monobasic equimolecular acids, namely into caffeic acid and quinic acid.

The process takes place formulary in the following manner:

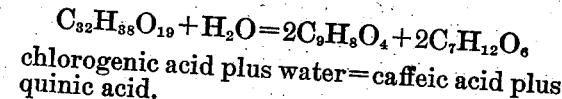

chlorogenic acid plus water=caffeic acid plus quinic acid.

A still deeper decomposition of the chlorogenic acid with accompanying appearance of caffeic acid and quinic acid could be obtained by treating the said chlorogenic acid in aqueous solution under high pressure.

The hylrolytic decomposition of the pure free chlorogenic acid into caffeic acid and quinic acid suggested the idea to effect this decomposition in the coffee-bean itself with regard to the free and combined acid. From the numerous attempts made in this direction it resulted that by applying higher temperatures obtained by pressure, this decomposition takes already place in a reliable manner in the presence of water only. The co-application of alkali-hydroxides and alkali-carbonates or of mineral acids may generally be dispensed with as it presents certain difficulties in so far as the quantities required for the decomposition can not always be measured precisely, especially as these chemicals are acting not only upon the chlorogenic acid, but also on the products of decomposition of the same as well as also on the other constituent parts of the coffee whereby accompanying undesirable combinations and decompositions may take place.

As specially essential it has been made out that in hydrolizing the chlorogenic acid in the presence of water only the decomposition is progressing gradually and may be adjusted as required.

The decomposition of acid effected in accordance with the above rules in different kinds of coffee has shown such marked and reliable results, that it must be considered as an established fact, that strong tasting coffees, which hitherto could not be used at all or for blending or mixing purposes only, can now be prepared for being adapted for direct enjoyment and for having a highly refined taste, as this has been certified by a great number of comparing tasters.

It is generally known to expose the raw coffee-beans, dry or damp whilst being kept in motion, for a longer or shorter period of time to a pressure above the atmospheric pressure, with or without the application of alkalis, alkaline earths and ammonia or acids. It is old to treat the coffee-beans with dry or moist flowing steam. All of these processes however have solely the purpose to swell the beans during the production of coffee free of caffeine and to thereby set free the caffeine from its combination with the chlorogenic acid, in order to get the caffeine easier out of the coffee-beans by organic dissolving means, or in order to fully expel again the said organic dissolving means from the coffee-beans by means of streaming dry or moist steam under pressure. Up to date no one has thought of decomposing the chlorogenic acid into caffeic acid and quinic acid by means of water vapors under pressure for the purpose of reducing or abolishing the strong taste of any coffee.

*Example.*—Into a rotatable pressure container or receptacle provided with a steam-jacket are brought 100 kg. of raw coffee. The container is heated under constant rotation until the pressure amounts to 1 atm. Hereupon whilst continuing the rotation, direct steam is introduced, and according to the quality of the coffee the pressure is left at 1 atm. or raised to 2 or 3 atm. The beans absorb hereby 6 to 10 per cent of water increasing in bulk accordingly. At this pressure varying according to requirement, the coffee is left for 1 to 3 hours and kept continuously in motion, until the desired degree of the hereby effected decomposition of the chlorogenic acid into caffeic acid and quinic acid is obtained. A strong Victoria-coffee, for example, required a pressure of 2 atm. during 2 hours.

In case the coffee to be treated has a natural moisture of about 12 to 15 per cent, the decomposition of the chlorogenic acid may also be effected by indirect heating alone, whereat the required pressure with the corresponding temperature is maintained by the proportion of water contained in the coffee-beans and being sufficient for this special case. The period of time necessary for carrying out this modified form of the process is however considerably longer.

Finally the decomposition may also be performed under co-application of potassium- and sodium-hydroxide or of the corresponding carbonates, as well as of a mineral acid such as hydrochloric acid or sulphuric acid, by adding to the raw coffee in the pressure-container according to requirement or solution or dilution of 0.1 to 0.3 per cent of the above named chemicals in quantities of 6 to 10 per cent of the coffee under treatment after the latter has been brought in the pressure-container by indirect heating under a pressure of 1 atm. whereupon the coffee is further treated as described above. After the decomposition the coffee must be subjected to a neutralizing aftertreatment.

I claim:

1. A process for improving coffee-beans which comprises treating them with hydrolytic agents at least one hour and under a pressure of at least one atmosphere whereby the chlorogenic acid contained in the coffee-beans is decomposed.

2. A process for improving coffee-beans which comprises treating them with water vapor for at least one hour and under a pressure of at least one atmosphere while agitating the mass, whereby the chlorogenic acid contained in the coffee-beans is decomposed.

3. A process for improving coffee-beans which comprises moistening them with water and then heating them for at least one hour while agitating the mass, whereby the chlorogenic acid contained in the coffee-beans is decomposed.

4. A process for improving coffee-beans which comprises treating them with wet steam for a period of two hours and under a pressure of two atmospheres, while agitating the mass whereby the chlorogenic acid contained in the coffee-beans is decomposed.

5. A process for improving coffee-beans which comprises treating them with water vapor under a pressure to 1 to 3 atmospheres to the extent that they absorb 6 to 10% by weight of water for at least one hour, whereby the chlorogenic acid is decomposed.

In testimony whereof I affix my signature.

KARL LENDRICH.